US012697692B2

(12) United States Patent
Cambruzzi et al.

(10) Patent No.: US 12,697,692 B2
(45) Date of Patent: Aug. 4, 2026

(54) INSTALLATION DEVICE FOR CARRYING OUT INSTALLATION STEPS ON A WALL AND METHOD FOR EXCHANGING A TOOL OF AN INSTALLATION APPARATUS

(71) Applicant: Inventio AG, Hergiswil (CH)

(72) Inventors: Andrea Cambruzzi, Zürich (CH); Luciano Passoni, Castelnuovo Rangone (IT); Oliver Simmonds, Lucerne (CH); Philipp Zimmerli, Härkingen (CH)

( * ) Notice: Subject to any disclaimer, the term of this patent is extended or adjusted under 35 U.S.C. 154(b) by 931 days.

(21) Appl. No.: 17/759,523

(22) PCT Filed: Feb. 1, 2021

(86) PCT No.: PCT/EP2021/052239
§ 371 (c)(1),
(2) Date: Jul. 27, 2022

(87) PCT Pub. No.: WO2021/156167
PCT Pub. Date: Aug. 12, 2021

(65) Prior Publication Data
US 2023/0094665 A1 Mar. 30, 2023

(30) Foreign Application Priority Data
Feb. 7, 2020 (EP) ..................................... 20156037

(51) Int. Cl.
*B23Q 3/157* (2006.01)
*B23Q 3/155* (2006.01)
(Continued)

(52) U.S. Cl.
CPC ..... *B23Q 3/15713* (2013.01); *B23Q 3/15503* (2016.11); *B23Q 3/15536* (2016.11);
(Continued)

(58) Field of Classification Search
CPC ...... B23Q 3/155–3/15793; B23Q 2003/15537; B23Q 3/15773; B23Q 2003/155456;
(Continued)

(56) References Cited

U.S. PATENT DOCUMENTS

| | | |
|---|---|---|
| 4,784,421 A | 11/1988 | Alvite |
| 4,819,320 A | 4/1989 | Cairns et al. |

(Continued)

FOREIGN PATENT DOCUMENTS

| | | |
|---|---|---|
| CN | 201279178 Y | 7/2009 |
| CN | 101905527 A | 12/2010 |

(Continued)

*Primary Examiner* — Erica E Cadugan
(74) *Attorney, Agent, or Firm* — Schlee IP International, PC; Alexander R. Schlee; Pascal A. Schlee

(57) ABSTRACT

An installation device for carrying out installation steps on a wall, and a method for exchanging a tool received by the installation apparatus, include an installation apparatus having a drive unit coupled to a tool holder. The tool holder receives a tool that extends away from the tool holder in a tool direction and which tool is driven by the drive unit. The tool holder can assume a locked state and an unlocked state, wherein a tool received by the tool holder can be removed from the tool holder in the unlocked state and is fixed in the tool holder, and therefore cannot be removed, in the locked state. The installation apparatus has an unlocking device controllable by an actuator and the tool holder can be brought from the locked state into the unlocked state by the actuator to release the tool.

10 Claims, 2 Drawing Sheets

(51) Int. Cl.

| | |
|---|---|
| *B23Q 17/00* | (2006.01) |
| *B23Q 17/24* | (2006.01) |
| *B25J 11/00* | (2006.01) |
| *B25J 15/04* | (2006.01) |
| *B66B 19/00* | (2006.01) |

(52) U.S. Cl.

CPC ...... *B23Q 3/15539* (2016.11); *B23Q 3/15773* (2013.01); *B23Q 17/002* (2013.01); *B23Q 17/2485* (2013.01); *B23Q 2003/15537* (2016.11); *B23Q 2003/155453* (2016.11); *B23Q 2003/1558* (2013.01); *B23Q 17/2466* (2013.01); *B25J 11/005* (2013.01); *B25J 15/04* (2013.01); *B66B 19/00* (2013.01); *Y10S 483/901* (2013.01); *Y10T 483/10* (2015.01); *Y10T 483/13* (2015.01); *Y10T 483/136* (2015.01); *Y10T 483/1738* (2015.01); *Y10T 483/1855* (2015.01)

(58) Field of Classification Search

CPC ...... B23Q 3/15534; B23Q 2003/15527; B23Q 3/15553; B23Q 17/2485; B23Q 17/24–17/2495; B25J 15/0491; Y10S 483/901; Y10S 483/902; Y10T 483/1774; Y10T 483/1809; Y10T 483/13–138

USPC ........................... 483/901, 47, 902, 59, 7–11

See application file for complete search history.

(56) References Cited

U.S. PATENT DOCUMENTS

| | | | | |
|---|---|---|---|---|
| 4,928,381 | A * | 5/1990 | Yaguchi ............. | B23Q 3/15706 |
| | | | | 483/47 |
| 5,068,958 | A * | 12/1991 | Kosmowski ........ | B23Q 3/1554 |
| | | | | 483/53 |
| 5,277,689 | A * | 1/1994 | Ruetschle ........... | B23Q 3/1554 |
| | | | | 483/902 |
| 2005/0049126 | A1* | 3/2005 | Everson ............. | B23Q 3/15513 |
| | | | | 483/47 |
| 2018/0326507 | A1 | 11/2018 | Halvorsen et al. | |

FOREIGN PATENT DOCUMENTS

| | | |
|---|---|---|
| CN | 103203644 A | 7/2013 |
| CN | 204037113 U | 12/2014 |
| CN | 107848767 A | 3/2018 |
| CN | 207426933 U | 5/2018 |
| CN | 109071181 A | 12/2018 |
| CN | 109238603 A | 1/2019 |
| CN | 209468039 U | 10/2019 |
| CN | 209614863 U | 11/2019 |
| DE | 3634018 A1 | 4/1988 |
| DE | 102012223094 A1 | 6/2014 |
| EP | 3546127 A1 | 10/2019 |
| WO | 2017016780 A1 | 2/2017 |
| WO | 2020025288 A1 | 2/2020 |

* cited by examiner

58 FIRST SENSOR
60 SECOND SENSOR
70 LIGHT BARRIER

58 FIRST SENSOR
68 SECOND SENSOR UNIT
70 LIGHT BARRIER

INSTALLATION DEVICE FOR CARRYING OUT INSTALLATION STEPS ON A WALL AND METHOD FOR EXCHANGING A TOOL OF AN INSTALLATION APPARATUS

FIELD

The invention relates to an installation device for carrying out installation steps on a wall, and a method for exchanging a tool received by an installation apparatus of an installation device for carrying out installation steps on a wall.

BACKGROUND

U.S. Pat. No. 4,819,320 describes an installation device comprising an installation apparatus in the form of a drilling machine. The drilling machine has a drive unit and a tool holder which can receive and fix a tool in the form of a drill bit. The tool holder can assume a locked state and an unlocked state, with a tool received by the tool holder being removable from the tool holder in the unlocked state and fixed in the tool holder in the locked state. The installation device has a mechatronic installation component in the form of a robot that can receive and move the drilling machine and can drill holes using the drilling machine. The installation device also has an exchanging device for exchanging the drill bit of the drilling machine in an automated manner. In order to remove a drill bit from the drilling machine, the drill bit must be pressed into a recess in the exchanging device that is adapted to the tool holder, and the tool holder must thus be brought into the unlocked state. In this state, the drill bit can be removed and a new drill bit can then be inserted.

In order to remove the drill bit, the drilling machine must be brought into a predetermined position relative to the exchanging device. If a drill bit becomes stuck in the drilled hole while drilling a hole and can no longer be removed from the drilled hole, the drilling machine can no longer be moved to the exchanging device by the robot. In this case, an automated exchange of the drill bit is no longer possible, and an installer therefore has to intervene manually.

SUMMARY

By contrast, an object of the invention is in particular that of proposing an installation device for carrying out installation steps on a wall and a method for exchanging a tool received by an installation apparatus of an installation device for carrying out installation steps on a wall, which allow an automated exchange of the tool in as many situations as possible and thus make necessary manual intervention by an installer as rare as possible.

The installation device according to the invention for carrying out installation steps on a wall has an installation apparatus for carrying out installation steps on a wall. The installation apparatus has a drive unit and a tool holder. The tool holder is coupled to the drive unit and is provided for receiving a tool which extends away from the tool holder in a tool direction and can be driven by the drive unit. The tool holder can assume a locked state and an unlocked state, with a tool received by the tool holder being removable from the tool holder in the unlocked state and fixed in the tool holder, and therefore non-removable, in the locked state. According to the invention, the installation apparatus has an unlocking device which has a controllable actuator and is designed and arranged such that the tool holder can be brought from the locked state into the unlocked state by means of the actuator and the tool can therefore be released.

The installation device also has a mobile installation frame, a mechatronic installation component and a controllable gripper for fixing a tool. The mechatronic installation component and the gripper are arranged on the installation frame in this case. The installation apparatus can be received and moved by the mechatronic installation component. The installation device can be provided in particular for carrying out installation steps in a shaft, in particular an elevator shaft.

Providing an unlocking device on the installation apparatus allows the unlocked state of the tool holder to be set by corresponding control of the actuator of the unlocking device, and thus allows the tool to be removed from the tool holder regardless of the position of the installation apparatus. The installation apparatus therefore does not have to be brought into a predetermined position in order to be able to remove a tool from the tool holder and thus from the installation apparatus. If, for example, a tool in the form of a drill bit jams in a borehole, the tool holder can be brought into the unlocked state by corresponding control of the actuator of the unlocking device, and the drill bit can thus be released. After the drill bit has been released, the drill bit can be removed from the tool holder and thus from the installation apparatus by a corresponding movement of the installation apparatus away from the drill bit. In this case, the drill bit remains stuck in the hole. The movement can also be automated, for example by a mechatronic installation component in the form of an industrial robot. After the drill bit has been removed from the installation apparatus, a new drill can be received and further installation steps can be carried out in an automated manner. The tool can also be designed as a setting tool for driving an anchor rod into a drilled hole by impact. In this case, the setting tool may tilt relative to the anchor rod and no longer be detachable from the anchor rod after the anchor rod has been driven in. The setting tool can then be removed from the installation apparatus analogously to the described removal of a drill bit, and manual intervention by an installer can thus be prevented. In this case, the setting tool remains on the anchor rod driven into the wall.

The installation apparatus is designed in particular as a mobile installation apparatus. This is to be understood to mean that the installation apparatus can be easily transported and used at different locations. It is not part of a machine tool arranged in a machine hall in a stationary manner.

The installation apparatus is in particular designed as a drilling device, for example in the form of an impact drilling machine, or as a setting device for driving anchor rods into drilled holes by impact. The installation apparatus is thus used in particular for drilling holes in the wall or for driving anchor rods into drilled holes in the wall by impact. The installation apparatus can be used in particular for carrying out installation steps in an automated manner. For example, installation steps for installing an elevator system in an elevator shaft can be carried out in an automated manner by means of the installation apparatus. However, other purposes are also possible, for example installation steps for laying cables or installing ventilation pipes.

The wall is in particular designed as a wall in a building, although a floor or a ceiling in a building can also be regarded as a wall. However, the wall can also be arranged on or in a bridge, a pillar or a ship, for example. The wall in particular consists of concrete strengthened with reinforcements.

The drive unit of the installation apparatus has a drive machine, in particular an electric motor, which is controlled by a control device of the installation apparatus. The individual components of the drive unit are arranged in a housing.

The tool holder is coupled to the drive unit in particular via a form-fitting connection. The tool holder of a drilling device is also referred to as a so-called drill chuck.

The tool which is fixed or held, and thus received, by the tool holder has a shape which is elongated in a tool direction. The tool is in particular rotated about an axis extending in the tool direction, such that the tool direction can also be referred to as the tool axis. The tool can be designed as a drill bit, for example. The tool can also be designed as a setting tool for driving anchor rods into drilled holes by impact. Such a setting tool also has a shape which is elongated in a tool direction. The setting tool can be designed, for example, in accordance with a setting tool described in EP 3546127 A1. The tool holder receives an end of the tool, such that the rest of the tool extends away from the tool holder in the tool direction and thus also extends away from the drive unit.

The connection between the tool holder and the tool is produced via a frictional or form-fitting connection. A form-fitting connection can, for example, be achieved by means of one or more balls which enter corresponding grooves. The tool can thus be driven by the drive unit via the tool holder, i.e. the tool can in particular be rotated about the tool axis. Additionally or alternatively, the drive can also be implemented by transmitting impacts in the tool direction to the tool.

The tool holder can assume a locked state and an unlocked state. In the locked state, a tool received by the tool holder is fixed in the tool holder and cannot be removed from the tool holder. When performing an installation step, for example when drilling a hole, the tool holder is in the locked state. In order to remove the tool from the tool holder, for example because it is worn out and needs to be replaced or because a different tool is required for a next installation step, the tool holder is brought into the unlocked state. In the unlocked state, the tool can be removed from the tool holder, i.e. the tool can be pulled out of the tool holder in particular in the tool direction.

Introducing or inserting a tool into the tool holder and thus into the installation apparatus is in particular also possible when the tool holder is in the locked state. For this purpose, the tool must in particular have a suitable rotational position relative to the tool holder. Insertion can be possible, for example, in two defined rotational positions. In order to insert a tool, the tool can, for example, be pressed into the tool holder and then rotated about the tool axis until one of the defined rotational positions is reached and the tool can be fully inserted into the tool holder.

The unlocking device, by means of which the tool holder can be brought from the locked state into the unlocked state, is part of the installation apparatus. It is therefore also moved when the installation apparatus is moved. The unlocking device is in particular arranged on the drive unit. The actuator of the unlocking device can be designed, for example, as an electric motor, an electromagnet or a pneumatic or hydraulic piston-cylinder unit. The actuator is controlled by a control device. The control device can also control the drive unit of the installation apparatus. However, it can also be designed as a separate control device.

In an embodiment of the invention, the tool holder has a main body and a locking sleeve. The locking sleeve can be moved relative to the main body in the tool direction, as a result of which the tool holder can be brought from the locked state into the unlocked state and vice versa. The locking sleeve can be moved by means of the actuator of the unlocking device such that the tool holder can be brought from the locked state into the unlocked state. The tool holder can thus be brought into the unlocked state in a particularly simple manner.

It is also possible for the tool holder to be brought into the locked state by rotating the locking sleeve about the tool axis or by pressing an unlocking button.

In this case, the tool holder is coupled to the drive unit via the main body. In order to bring the tool holder from the locked state into the unlocked state, the locking sleeve has to be moved in particular in the direction of the drive unit. In this case, a force of a spring in particular has to be overcome, which force moves the locking sleeve away from the drive unit, i.e. seeks to bring the tool holder into the locked state. In this case, the actuator of the unlocking device only has to apply a force to the locking sleeve in the direction of the drive unit and can therefore only move the locking sleeve in the direction of the drive unit. The force required to move the locking sleeve back away from the drive unit is applied by the aforementioned spring; the actuator only has to release or permit the movement.

The main body and the locking sleeve have in particular a mainly rotationally symmetrical outer contour, the axis of symmetry extending in the tool direction. The main body enters the locking sleeve to a small extent. The tool holder can be designed, for example, in accordance with a tool holder from DE 10 2012 22 3094 A1.

In an embodiment of the invention, the unlocking device has a stationary part and a part which is movable in the tool direction. The unlocking device is arranged on the drive unit via the stationary part. A coupling element is arranged on the movable part, which coupling element is designed and arranged such that it can move the locking sleeve in the tool direction. This makes a particularly simple design of the unlocking device possible.

In this case, the actuator is in particular designed as a pneumatically actuated piston-cylinder unit, the cylinder being formed by the stationary part and the piston being formed by the movable part. The coupling element has in particular two arms which are spaced apart perpendicularly to the tool direction and which engage on opposite sides of a circumferential collar of the locking sleeve and can thus apply a force to the locking sleeve in the tool direction. The arms in particular rest against the collar of the locking sleeve such that a force can only be applied in the direction of the drive unit and the locking sleeve can therefore only be moved in the direction of the drive unit by the unlocking device. The force for moving the locking sleeve away from the drive unit is applied by a correspondingly arranged spring of the tool holder. The spring can move the locking sleeve when the unlocking device does not apply a sufficient counterforce to the locking sleeve via the coupling element and thus permits the movement.

The actuator of the unlocking device in the form of the piston-cylinder unit is in this case controlled by applying compressed air. In order to apply compressed air to the piston-cylinder unit, a control device controls at least one upstream valve accordingly. When compressed air is applied, the movable part, and thus, via the coupling element, the locking sleeve, are moved in the direction of the drive unit in the tool direction. The tool holder is thus brought from the locked state to the unlocked state. In this state of the tool holder, the tool can be removed from the tool holder and thus from the installation apparatus, i.e. pulled away from the tool holder and thus from the installation apparatus in the tool direction. In order to limit the movement of the movable part of the unlocking device, the movable part in particular has a stop which abuts, for example, the stationary part of the unlocking device or the drive unit of the installation apparatus when the maximum movement is reached.

After removing the tool, the action on the piston-cylinder unit ends and the cylinder is vented. The locking sleeve is moved away from the drive unit in the tool direction by means of the spring, and the tool holder is thus brought back into the locked state. The movable part of the unlocking device is thus also moved away from the drive unit again in the tool direction via the coupling element.

It is also possible for the piston-cylinder unit to have two compressed air connections. Thus, by a corresponding action of one of the two compressed air connections, the piston, i.e. the movable part of the unlocking device, can be moved with the coupling element in the desired direction.

In an embodiment of the invention, the drive unit has an interface via which control signals can be transmitted to the drive unit. The installation apparatus can thus be used particularly easily by a mechatronic installation component, in particular by an industrial robot.

The control signals transmitted via the interface can, for example, be in the form of instructions for starting or stopping the drive machine of the drive unit or also in the form of a setpoint speed of the drive machine. Energy, in particular electrical energy for operating the drive unit, can also be transmitted via the interface. The interface can also be used to establish a mechanical connection to the drive unit and thus to the installation apparatus or to provide compressed air for the installation apparatus. The interface can be designed, for example, as part of a quick-change system for industrial robots. It is also possible for the drive unit to have a plurality of different interfaces.

The installation frame of the installation device can, for example, be designed as a simple platform, framework, scaffold, cabin or similar with optional attachments. The installation frame is in particular made of metal, for example metal profiles. The installation frame can, for example, be designed according to a carrier component described in WO 2017/016780 A1.

The mechatronic installation component of the installation device is designed in particular as an industrial robot. The mechatronic installation component can, for example, be designed according to a mechatronic installation component described in WO 2017/016780 A1. However, other designs of the mechatronic installation component are also possible. For example, the mechatronic installation component can only have one arm that can be moved in and out in one direction by means of an actuator.

The gripper of the installation device has at least one, in particular two gripping arms, which can be moved toward and away from one another by means of at least one actuator. A tool arranged between the gripping arms can therefore be clamped and thus fixed or released. For this purpose, the gripping arms have a shape which corresponds to an outer contour of the tool. The gripper can be actuated electrically, pneumatically or hydraulically, for example.

The gripper and thus also the gripping arms are in particular mainly made of metal, for example in the form of stainless steel. One or both gripping arms can have an elastic insert or layer, for example in the form of a rubber insert, on their relevant inner side, i.e. on the side facing the tool. In this way, tolerances between a desired positioning and an actual positioning of the gripper relative to the tool can advantageously be compensated for. This makes a particularly robust automated tool exchange possible.

The installation device is configured such that the mechatronic installation component can position the installation apparatus such that the gripper can clamp and fix a tool received in the tool holder of the installation apparatus. The gripper or the actuator(s) of the gripper are controlled in particular by the same control device that also controls the drive machine of the installation apparatus. However, a separate control device can also be provided for the actuation.

In an embodiment of the invention, the gripper is arranged on the installation frame, via a holder which is arranged in a stationary manner on the installation frame, so as to be movable from a rest position in the tool direction. The gripper is pressed into the rest position by a spring. This advantageously allows the above-described introduction or insertion of a tool by pressing the tool into the tool holder while rotating it at the same time. When the tool reaches one of the defined rotational positions described above, the gripper and thus the tool are moved by the the spring in the tool direction in the direction of the tool holder and the tool is thus fully inserted into the tool holder.

The gripper can be moved, for example, between 10 and 30 mm from the rest position in the tool direction relative to the holder. The connection between the holder and the gripper is established, for example, by means of one or in particular two sliding guides.

In an embodiment of the invention, the installation device has a first sensor unit, by means of which a position of the gripper in relation to the holder in the tool direction can be detected. This allows the introduction or insertion of a tool into the tool holder to be monitored. An installation method using the installation device or a corresponding installation process can thus be carried out in a particularly process-reliable manner.

The first sensor unit can be designed such that it can continuously detect the stated position of the gripper, i.e. it can have a distance sensor, for example. It is also possible that only individual discrete positions of the gripper, i.e. the rest position, an end position in the case of a maximum movement, and a position in which the tool is received correctly in the tool holder, for example, can be detected. For this purpose, the first sensor can have one or more position switches.

By monitoring the position of the gripper, it can in particular be detected whether the tool has been correctly inserted into the tool holder, i.e. whether it has been received correctly by the tool holder. In the case of a correct insertion of the tool, the position of the gripper must change from the rest position, either directly or via the maximum movement position, to the position in which the tool is received correctly in the tool holder.

In an embodiment of the invention, the gripper is designed such that it can fix at least two different tools. The installation device can thus use different tools and thus carry out different installation steps. It can therefore be used very flexibly.

The gripper is in particular designed such that it can fix drill bits having different diameters, a drill bit and a setting tool, or drill bits having different diameters and a setting tool, for example. It is also possible for the gripper to also be able fix other types of tools.

For this purpose, the gripping arms of the gripper in particular have a plurality of recesses which are adapted to the outer contours of the tools to be fixed.

In an embodiment of the invention, the gripper can assume an open state and a closed state. A second sensor unit is arranged on the gripper, by means of which a state of the gripper can be detected. In this way, the fixing of a tool by means of the gripper can be monitored. An installation method using the installation device or a corresponding installation process can thus be carried out in a particularly process-reliable manner.

It is also possible for the gripper to be able assume a fixing state which is between the open state and the closed state. The gripper assumes the fixing state when it is guided from the open state in the direction of the closed state and a tool is arranged between the gripping arms thereof such that it clamps or fixes the tool. The tool thus prevents the closed state from being assumed. It can thus be detected whether the gripper is fixing a tool or not.

The second sensor device can be designed such that it can continuously detect the state of the gripper, i.e. it can have a distance sensor, for example, which detects the distance between the gripping arms. It is also possible that only individual, discrete positions of the gripping arms, i.e. the positions in the open/fixed and/or closed state, for example, can be detected. For this purpose, the second sensor unit can have one or more position switches.

In an embodiment of the invention, a light barrier is arranged on the gripper, which light barrier is designed and arranged such that the tool can be moved perpendicularly to the tool direction through the light barrier. An installation method using the installation device or a corresponding installation process can thus be carried out in a particularly process-reliable manner.

The light barrier can be used, for example, to monitor whether a tool for fixing is being supplied to the gripper. The light barrier then has to be arranged such that a tool supplied to the gripper is guided through the light barrier, i.e. interrupts a light beam of the light barrier.

Additionally or alternatively, a diameter of the tool can be determined by means of the light barrier. Since the position and orientation of the mechatronic installation component and thus also the positions and orientations of the installation apparatus and the tool are known, the diameter of the tool can be determined by the light barrier when the tool is moved through the light barrier perpendicularly to the tool direction. With the diameter determined in this way, it can be checked whether the diameter still corresponds to target specifications and an exchange of the tool can be initiated if necessary.

Additionally or alternatively, the extension of the tool in the tool direction can be determined by means of the light barrier. For this purpose, the tool can be moved towards the light beam of the light barrier in the tool direction until the light beam is interrupted. The extension of the tool in the tool direction can be inferred from the position and orientation of the installation apparatus. In this way, for example, a breakage of a part of a drill bit, in particular a so-called crown, can be detected. With the extension of the tool determined in this way, it can be checked whether the extension still corresponds to target specifications and an exchange of the tool can be initiated if necessary.

An installation device described above can particularly advantageously be part of an installation system for carrying out installation steps on a wall in a shaft. The installation system then additionally has a movement component for moving the installation device in the shaft.

A shaft is to be understood in this case to be an elongate space delimited by walls in the form of shaft walls. In particular, the shaft has a mainly rectangular cross section, although other cross sections are also conceivable. In particular, the shaft extends in a mainly vertical direction, such that movement in the shaft takes place mainly in the vertical direction. The shaft is used in particular as an elevator shaft of an elevator system, in which, during operation of the elevator system, a car for transporting people and/or objects is moved in the movement direction. The shaft can also serve other purposes; for example, it can be used as a ventilation shaft or to accommodate pipes, electric cables, or the like.

The installation device can be moved within the shaft and can thus be positioned at different points, in particular at different heights within the shaft. For this purpose, the installation device is suspended from a movement component, in particular in the form of a winch, in particular via a suspension means, for example in the form of a cable, a chain. or a belt. The suspension means can be wound or unwound by the winch, and the installation device can thus be moved in the shaft.

The above-mentioned object is also achieved by a method for exchanging a tool by an above-described installation apparatus of an above-described installation device for carrying out installation steps on a wall, the method comprising the following steps:

moving the installation apparatus with an old tool held in the tool holder by means of the mechatronic installation component, such that the old tool assumes a holding position in which the gripper can fix the old tool, fixing the old tool by means of the gripper, bringing the tool holder into the unlocked state by means of the unlocking device, and moving the installation apparatus away from the old tool in the tool direction, at least until the old tool is no longer inside the tool holder.

The method according to the invention has the same advantages as the described installation apparatus.

In an embodiment of the invention, the method comprises the following further steps:

setting down the installation apparatus, receiving a gripping tool by means of the mechatronic installation component, receiving a new tool from a magazine by means of the gripping tool, moving the gripping tool with the new tool by means of the mechatronic installation component until the new tool assumes a holding position in which the gripper can fix the new tool, fixing the new tool by means of the gripper, setting down the gripping tool, receiving the installation apparatus by means of the mechatronic installation component, moving the installation apparatus into a preparation position using the mechatronic installation component, moving the installation apparatus in the tool direction in the direction of the new tool until the new tool is inserted in the tool holder.

In this way, it is advantageously not only possible for an old tool be removed from the tool holder of an installation apparatus, but also for a new tool to be inserted. This allows installation steps to be carried out in a largely automated manner without the need for manual intervention by an installer.

Setting down the installation apparatus or the gripping tool is in this case to be understood as meaning that the installation apparatus or the gripping tool is arranged in a holder provided for this purpose by the mechatronic installation component and is then separated or uncoupled from the mechatronic installation component.

Receiving a gripping tool or the installation apparatus is in this case to be understood to mean that the gripping tool or the installation apparatus is received by or coupled to the mechatronic installation component. The gripping tool is designed to grip and hold a tool. The tool can thus be moved or displaced by the mechatronic installation component. For this purpose, the gripping tool in particular has two gripping arms which can clamp the tool therebetween and thus hold it. The gripping tool can be actuated electrically, pneumatically or hydraulically, for example.

The preparation position is characterized in that, starting from the preparation position, the installation apparatus has to be moved exclusively in the tool direction in order to insert the new tool into the tool holder.

In an embodiment of the invention, the tool holder is rotated about an axis in the tool direction when the installation apparatus is moved in the tool direction in the direction of the new tool. A tool can thus be inserted in the tool holder as described above.

The tool holder can be rotated by rotating the entire installation apparatus by means of the mechatronic installation component. It is also possible for only the tool holder to be rotated by means of the drive machine of the drive unit. The tool holder is in particular rotated by at least 180°. It is also possible for one of the sensor devices to detect that the new tool has been inserted, and for the rotation to be terminated as a result.

In an embodiment of the invention, the method comprises the following further steps:

gripping the old tool fixed in the gripper using the gripping tool,
   releasing the old tool by means of the gripper, and
   setting down the old tool in a magazine.

Old tools are thus advantageously collected in a magazine and can, for example, be refurbished and reused later.

The old tool can be set down in the same magazine in which the new tools are kept. However, it is also possible for a separate magazine, for example in the form of a container, to be provided for storage.

As described above, the successful implementation of individual method steps can be checked by means of detections by the sensor devices described above.

In particular, the following checks can be carried out, although it is not necessary to carry out all of the checks:

When the installation apparatus is moved such that the old tool assumes the holding position, the light barrier can be used to check whether the old tool has actually assumed the holding position. In this case, the light beam has been interrupted by the old tool.
   Correct fixation of the old tool and the new tool can be checked by means of the second sensor unit.
   After the installation apparatus has been moved away from the gripper in order to remove the old tool, the second sensor unit can be used to check whether the old tool is still fixed in the gripper and thus whether the removal of the old tool from the installation apparatus was successful.
   The correct insertion of a new tool into the tool holder can be checked by means of the first sensor unit as described above.

It must be noted that some of the possible features and advantages of the invention are described herein with reference to different embodiments of the installation apparatus according to the invention and the method according to the invention. A person skilled in the art recognizes that the features may be combined, adapted, transferred or exchanged as appropriate in order to yield other embodiments of the invention.

Further advantages, features and details of the invention can be found in the following description of embodiments and with reference to the drawings, in which like or functionally like elements are provided with identical reference signs. The drawings are merely schematic and are not to scale.

In the drawings, the installation apparatus is designed as an impact drilling machine and the tool is designed as a drill bit. The installation apparatus can also be designed as another apparatus, for example an installation apparatus for driving anchor bolts into drilled holes by impact, and the tool can be designed as another tool, for example as a setting tool for driving anchor bolts into drilled holes by impact.

DETAILED DESCRIPTION

Figure 1:
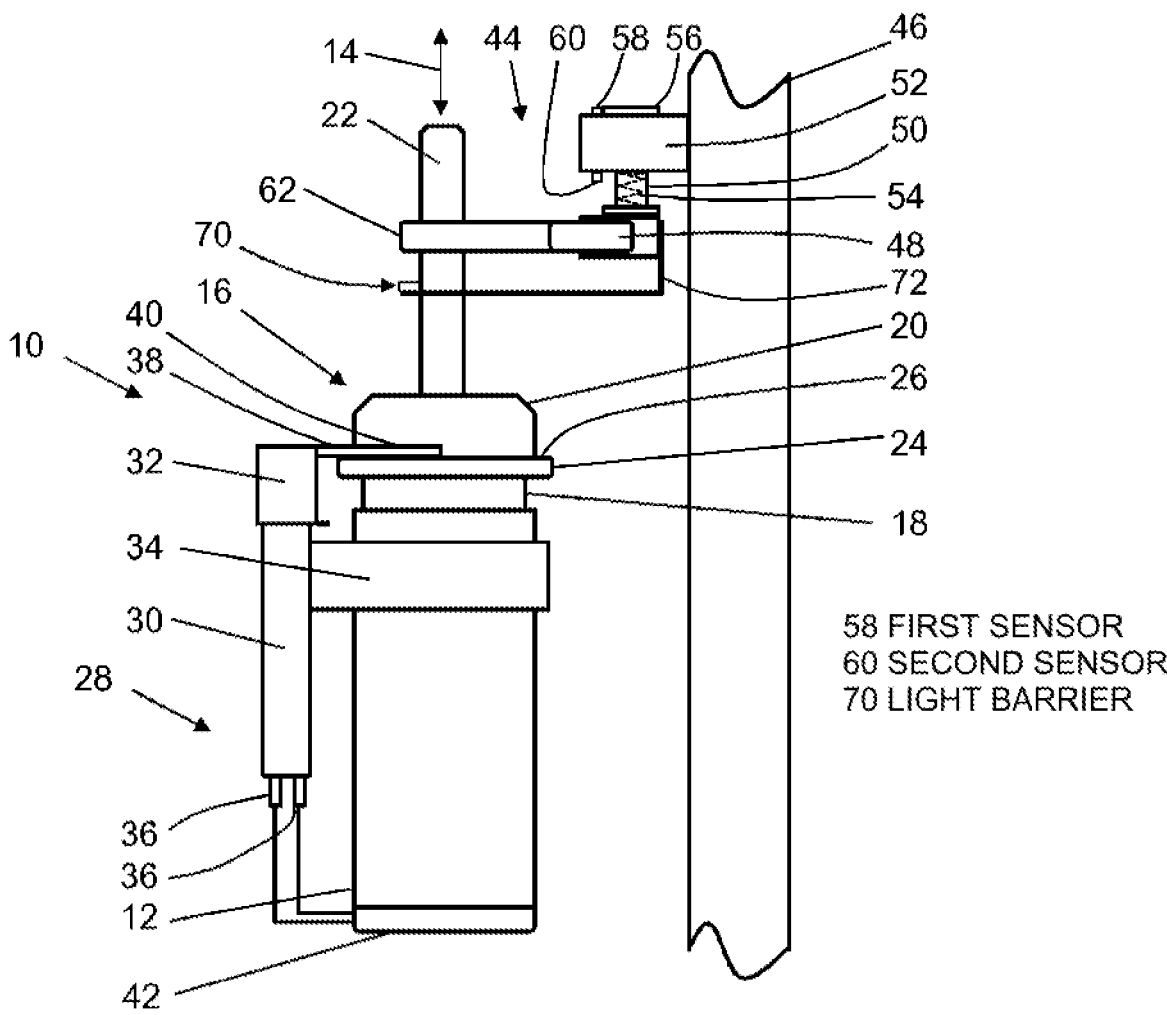
FIG. 1 is a side view of an installation apparatus having an unlocking device and a gripper of an installation device.

According to FIG. 1, an installation apparatus 10 in the form of an impact drilling machine has a drive unit 12 which has a mainly cylindrical basic shape. The drive unit 12 has a drive machine (not shown) in the form of an electric motor. The drive unit is controlled by a control device (not shown) of the drive unit 12. In a tool direction 14, which extends in the vertical direction in FIG. 1 and in which the drive unit 12 is oriented, a tool holder 16 in the form of a so-called drill chuck is coupled to the drive unit 12 at the top.

The tool holder 16 has a mainly rotationally symmetrical outer contour, the axis of symmetry extending in the tool direction 14. The tool holder 16 has a main body 18, which is coupled to the drive unit 12 via a form-fitting connection (not shown) such that the main body 18 and thus the tool holder 16 can be rotated by the drive unit 12 about the aforementioned axis of symmetry of the tool holder 16. The main body 18 of the tool holder 16 is non-rotatably connected to a locking sleeve 20 which it partially enters. A tool 22 in the form of a drill bit that extends away from the tool holder 16 in the tool direction 14 is received in the tool holder 16. The tool 22 is coupled to the tool holder 16 in a rotationally fixed manner, such that the tool 22 can also be driven by the drive unit 12, i.e. it can also be rotated. Holes can be drilled into a wall by the installation apparatus 10 and the tool 22 received by the tool holder 16.

The tool holder 16 can assume a locked state and an unlocked state, a tool 22 received by the tool holder 16 being removable from the tool holder 16 in the unlocked state and fixed in the tool holder 16 in the locked state such that it cannot be removed. In order to bring the tool holder 16 into the unlocked state, the unlocking sleeve 20 has to be moved in the tool direction 14 toward the drive unit 12, counter to the force of a spring (not shown) of the tool holder 16. The unlocking sleeve 20 has a circumferential collar 24 on the outer contour thereof that forms an annular actuating surface 26 extending perpendicularly to the tool direction 14. A force for moving the unlocking sleeve 20 in the direction of the drive unit 12 and thus for setting the unlocked state of the tool holder 16 can be applied to the unlocking sleeve 20 via this actuating surface 26.

The installation apparatus 10 has an unlocking device 28 which has a stationary part 30 and a part 32 which can be moved in the tool direction 14. The unlocking device 28 is fixedly connected to the drive unit 12 via the stationary part 30 and a holder 34 surrounding the drive unit 12. The stationary part 30 and the movable part 32 of the unlocking device form a pneumatic actuator in the form of a piston-cylinder unit. In this case, the cylinder is formed by the stationary part 30 and the piston is formed by the movable part 32. Two compressed air connections 36 are arranged on the stationary part 30, via which compressed air can be supplied and the piston-cylinder unit can thus be controlled. By supplying compressed air to the corresponding compressed air connection 36, the movable part 32 can be moved in the tool direction 14 away from or towards the stationary part 30.

Figure 2:
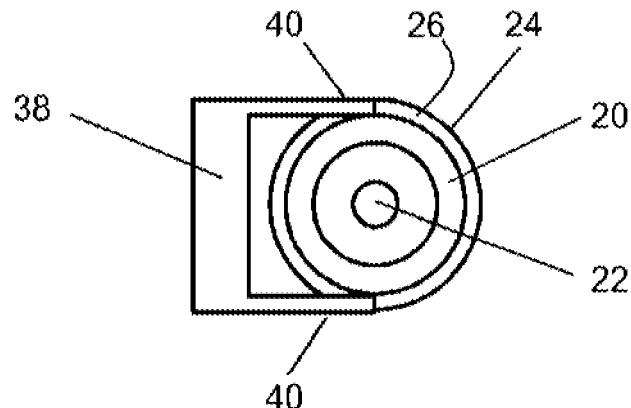
FIG. 2 is a view of a coupling element of the unlocking device from FIG. 1 from above.

A coupling element 38 extending perpendicularly to the tool direction 14 is arranged on the movable part 32 of the unlocking device 28. The coupling element 38 has a U-shaped basic shape with two arms 40 and is arranged such that the arms 40 bear against the actuating surface 26 of the circumferential collar 24 of the unlocking sleeve 20. The coupling element 38 and the unlocking sleeve 20 are shown in FIG. 2 in a view from above. By moving the movable part 32 in the direction of the stationary part 30 of the unlocking device 28, the coupling element 38 and thus the locking sleeve 20 are moved in the tool direction 14 toward the drive unit 12 and the tool holder 16 is thus brought into the unlocked state. When the movable part 32 is pushed away from the stationary part 30 of the unlocking device 28 by a corresponding application of compressed air, the coupling element 38 is pushed away from the stationary part 30 in the tool direction 14 by the drive unit 12. The spring (not shown) of the tool holder 16 can thus push the locking sleeve 20 away from the drive unit 12 in the tool direction 14, as a result of which the tool holder 16 is brought into the locked state.

The drive unit 12 also has an interface 42 via which control signals of a control device (not shown in FIG. 1; 94 in FIG. 4) of an installation system (74 in FIG. 4) can be transmitted to the control device of the drive unit 12. By means of the control signals, for example, the electric motor of the drive unit 12 can be started and a setpoint speed can also be specified for the motor, for example. The interface 42 is arranged opposite the tool holder 16 on the drive unit 12. The interface 42 is also used to mechanically couple the installation apparatus 10 to a mechatronic installation component (not shown in FIG. 1) in the form of an industrial robot (88 in FIG. 4) of an installation system (74 in FIG. 4), and to supply electrical energy and compressed air to the installation apparatus 10.

By means of a gripper 44 and a corresponding movement of the installation apparatus 10 relative to the gripper 44, the tool 22 of the installation apparatus 10 can be exchanged, i.e. an old tool can be removed from the tool holder 16 and a new tool can be inserted into the tool holder 16. For this purpose, the gripper 44 is arranged on a longitudinal beam 46 (i.e., a longitudinal frame element), extending in the tool direction 14, of a mobile installation frame (84 in FIG. 4) of an installation device (86 in FIG. 4) for carrying out installation steps on a wall (76 in FIG. 4). The mobile installation frame also includes a transverse frame element on which the mechatronic installation component (88) is arranged, as can be seen in FIG. 4.

The gripper 44 has a main body 48 which is connected via two rods 50 to a holder 52 arranged in a stationary manner on the longitudinal beam 46 so as to be movable in the tool direction 14. A helical spring 54 extending in the tool direction 14 between the holder 52 and the main body 48 is arranged between the two rods 50 such that it pushes the main body 48 and thus the gripper 44 away from the holder 52. The rods 50 are guided through the holder 52 in the tool direction 14 and can be moved in the tool direction 14 relative to the holder 52, as a result of which the aforementioned moveable connection between the holder 52 and the gripper 44 is provided. The rods 50 and the associated feedthroughs through the main body 48 thus form two sliding guides. The rods 50 have a circumferential collar 56 which is arranged on the side of the holder 52 opposite the gripper 44 and limits the downward movement of the gripper 44 relative to the holder 52. FIG. 1 shows a rest position of the gripper 44 in which it is at a maximum distance from the holder 52 and the collar 56 of the rods 50 therefore abuts the holder 52. In order to be able to detect the position of the gripper 44 relative to the holder 52, a first sensor 58 is arranged on the side of the holder 52 opposite the gripper 44. The first sensor 58 detects when the collar 56 of the rods 50 abuts the holder 52, i.e. when the gripper 44 is in the rest position. A second sensor 60 is arranged on the side of the holder 52 directed toward the gripper 44, which sensor detects when the gripper 44 has been moved at least by a predetermined amount in the direction of the holder 52. In particular, the second sensor 60 detects a movement of the gripper 44 that is slightly less than the maximum movement. The first and the second sensor 58 and 60 are in this case designed as proximity sensors and form a first sensor unit.

The gripper 44 has two gripping arms 62 which are arranged on two opposite sides of the main body 48. The gripping arms 62 can be moved away from one another or toward one another via a pneumatically actuated actuator (not shown) arranged in the main body. The gripping arms 62 extend in the tool direction 14 and each have two corresponding recesses 64, 66 (see FIG. 3). The gripper 44 and the gripping arms 62 are in particular made of stainless steel. The gripping arms can have a rubber insert (not shown) on their relevant inner side, i.e. on the side facing the tool.

Figures 3, 4:
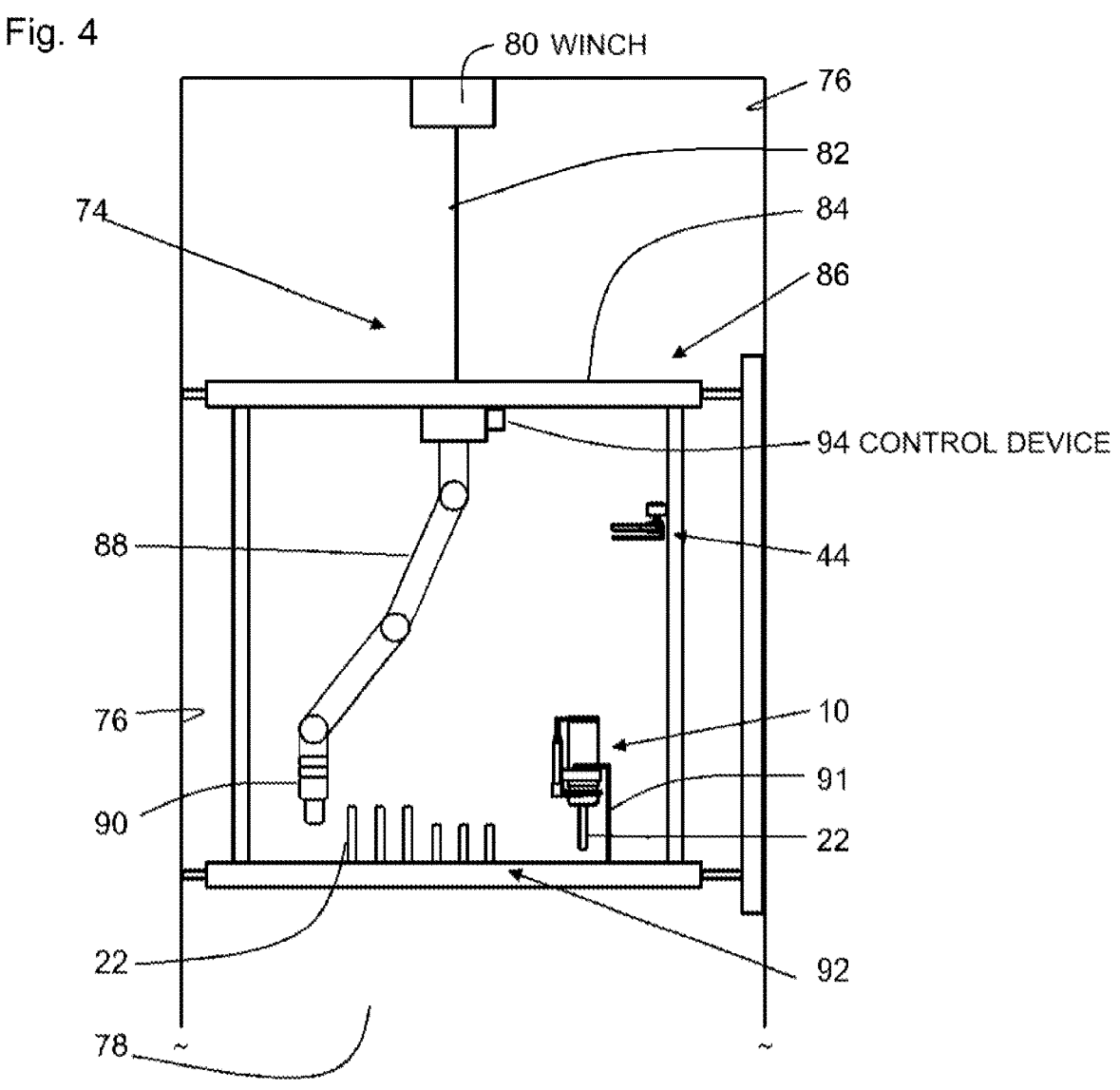
FIG. 3 is a view of the gripper from FIG. 1 from above.
FIG. 4 shows an installation system having an installation device and a movement component in an elevator shaft.

The tool 22 is positioned in FIGS. 1 and 3 such that it protrudes through the gripping arms 62 in the region of the recesses 64. The tool 22 is then in a so-called holding position relative to the gripper 44. The contour of the recesses 64 is adapted to the outer contour of the tool 22. A tool having smaller diameter would be positioned to match the recesses 66. If, starting from the situation shown in FIGS. 1 and 3, the gripping arms 62 are moved toward one another, they clamp the tool 22 therebetween and thus fix the tool 22.

The gripper 44 can assume three different states by means of a corresponding movement of the gripping arms 62. When the gripping arms 62 are arranged relative to one another such that a tool arranged in the region of the recesses 64, 66 is not clamped or fixed, then the gripper 44 is in the open state. This state is shown in FIG. 3. When the gripping arms 62 are arranged relative to one another such that they clamp or fix a tool arranged in the region of the recesses 64, 66, then the gripper 44 is in the fixing state. When the gripping arms 62 touch, then the gripper is in the closed state; this state can only be reached if no tool protrudes through the gripping arms 62. In order to be able to detect the three states mentioned, a second sensor unit 68 is arranged on the main body 48 and has three position switches (not shown in detail), each position switch being able to detect one of the three states of the gripper 44.

The gripper 44 also has a light barrier 70 which is arranged on the main body 48 via a holding plate 72. A light beam 71 of the light barrier 70 extends perpendicularly to the tool direction 14 in the region of the ends of the gripping arms 62 that face away from the main body 48. The light beam thus arranged such that a tool 22 supplied to the gripper 44 perpendicularly to the tool direction 14 in the direction of the main body 48 is guided through the light barrier 70, i.e. the light beam 71 of the light barrier 70 is interrupted. This makes it possible to check whether a tool 22 is actually brought into the holding position for fixing in the gripper 44. In addition, the diameter of the tool 22 can be determined when passing through the light barrier 70. In FIGS. 1 and 3, the tool axis 14 extends vertically and the light beam 71 of the light barrier 70 extends horizontally. The tool 22 is moved through the light beam 71 horizontally and perpendicularly to the light beam 71 in order to determine the diameter of the tool. Based on the information regarding the position of a mechatronic installation component (industrial robot 88 in FIG. 4) holding the installation apparatus 10 and the start of the interruption of the light barrier 70 by the tool 22, it is possible for the distance between the light beam 71 and the tool axis of the tool 22 and thus the radius or the diameter of the tool 22 to be determined. In addition, the end of the interruption of the light barrier 70 can also be taken into account and the diameter of the tool 22 can thus be determined directly.

FIG. 4 shows an installation system 74 for carrying out installation steps on a wall 76 in a vertical shaft 78 in the form of an elevator shaft. A movement component in the form of a winch 80 is arranged at the top of the shaft 78. The winch 80 is connected to an installation frame 84 of an installation device 86 for carrying out installation steps on the wall 76 via a suspension means in the form of a cable 82. The installation frame 84 and thus the installation device 86 can be moved in the vertical direction in the shaft 78 by means of the winch 80 and the cable 82. The installation frame 84 can be fixed in the shaft 78 such that it can assume a fixed position in the shaft 78. A mechatronic installation component in the form of an industrial robot 88 hanging downward is arranged at the top of the installation frame 84. As shown in FIG. 4, the industrial robot 88 can receive a gripping tool 90 or receive an installation apparatus 10 which is described above and is provided in an apparatus magazine 91 in FIG. 4. The industrial robot 88 can use the gripping tool 90 to grip and move the tools 22 described above. A magazine 92 in which tools 22 are stored is arranged in the lower region of the base frame 84. These tools can be new or usable or also old or worn.

A control device 94 which controls the winch 80, the industrial robot 88, the gripping tool 90 and the installation apparatus 10 is also arranged at the top of the installation frame 84. For this purpose, the installation system 74 has communication lines, compressed air lines and power lines (not shown).

If the industrial robot 88 has received an installation apparatus 10 in the form of a drilling machine, holes can be drilled in the walls 76 of the shaft 78 in an automated manner by appropriate control of the industrial robot 88 and the installation apparatus 10, and installation steps can thus be carried out in the shaft 78 in an automated manner.

Tools 22 wear out as they are used, in particular when a drill bit encounters a reinforcement in a wall 76 while drilling a hole. The installation device 86 can exchange a tool 22 of the installation apparatus 10, i.e. remove an old tool 22 from the installation apparatus 10 and insert a new tool 22, in an automated manner. The following steps are carried out in order to exchange a tool 22 of an installation apparatus:

receiving the installation apparatus 10 with an old tool 22 held in the tool holder 16 by means of the industrial robot 88, moving the installation apparatus 10 by means of the industrial robot 88 until the old tool 22 assumes the holding position shown in FIGS. 1 and 3, in which the gripper 44 can fix the old tool 22, fixing the old tool 22 by means of the gripper 44, bringing the tool holder 16 into the unlocked state by means of the unlocking device 28, moving the installation apparatus 10 away from the old tool 22 in the tool direction 14 by means of the industrial robot 88 until the old tool 22 is no longer inside the tool holder 16, setting down the installation apparatus 10 in the apparatus magazine 91 by means of the industrial robot 88, receiving the gripping tool 90 from the apparatus magazine 91 by means of the industrial robot 88, gripping the old tool 22 fixed in the gripper 44 by means of the gripping tool 90, releasing the old tool 22 by means of the gripper 44, setting down the old tool 22 in the magazine 92, gripping a new tool 22 from the magazine 92 using the gripping tool 90, moving the gripping tool 90 with the new tool 22 by means of the industrial robot 88 until the new tool 22 assumes the holding position shown in FIGS. 1 and 3, in which the gripper 44 can fix the new tool 22, fixing the new tool 22 by means of the gripper 44, setting down the gripping tool 90 in the apparatus magazine 91 by means of the industrial robot 88, receiving the installation apparatus 10 from the apparatus magazine 91 by means of the industrial robot 88, moving the installation apparatus 10 into a preparation position using the industrial robot 88, moving the installation apparatus 10 in the tool direction 14 in the direction of the new tool 22 until the new tool 22 is inserted in the tool holder 16 of the installation apparatus 10, with the installation apparatus 10 and thus the tool holder 16 being rotated about an axis in the tool direction 14, and releasing the new tool 22 by means of the gripper 44.

In addition, individual steps of the method described can be checked, as described, by means the two sensor units 58, 60 and 68 described above and the light barrier 70.

Finally, it should be noted that terms such as "comprising," "having," etc. do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An installation device for carrying out installation steps on a wall, the installation device comprising:

an installation apparatus having a drive unit and a tool holder, the tool holder being coupled to the drive unit;

wherein the tool holder is adapted to receive a tool, the tool extending away from the tool holder in a tool direction and being driven by the drive unit;

wherein the tool holder can assume a locked state and an unlocked state, wherein the tool received by the tool holder can be removed from the tool holder when the tool holder is in the unlocked state, and wherein the tool received by the tool holder is fixed in the tool holder when the tool holder is in the locked state;

an unlocking device having a controllable actuator that brings the tool holder from the locked state into the unlocked state;

a mobile installation frame having at least a longitudinal frame element and a transverse frame element;

a mechatronic installation component;

a controllable gripper adapted to fix the tool; and wherein the mechatronic installation component is arranged on the transverse frame element, wherein the gripper is arranged on the longitudinal frame element of the installation frame via a holder that is arranged of the installation frame in a stationary manner, wherein the gripper is movable in the tool direction relative to the tool holder from a rest position to a further position that is displaced in the tool direction from the rest position, the gripper being pressed into the rest position by a spring, and wherein the installation apparatus is received and moved by the mechatronic installation component to the gripper, said gripper configured to exchange the tool.

2. The installation device according to claim 1 wherein the installation device has a sensor unit adapted to detect a position of the gripper relative to the tool holder in the tool direction.

3. The installation device according to claim 1 wherein the gripper is adapted to fix at least the tool and a different tool.

4. The installation device according to claim 1 wherein the gripper is movable between an open state and a closed state, and including a sensor unit arranged on the gripper and adapted to detect the open state and the closed state.

5. The installation device according to claim 1 including a light barrier arranged on the gripper wherein the tool can be moved perpendicularly to the tool direction through the light barrier.

6. An installation system for performing installation steps on a wall in a shaft, the installation system comprising:

the installation device according to claim 1; and a movement component adapted to move the installation device in the shaft.

7. A method for exchanging the tool, wherein the tool is an old tool that is received by the installation apparatus of the installation device according to claim 1, the method comprising the steps of:

moving, via the mechatronic installation component, the installation apparatus with the old tool held in the tool holder such that the old tool assumes a holding position in which the gripper can fix the old tool;

fixing the old tool using the gripper;

bringing the tool holder into the unlocked state via the unlocking device; and moving the installation apparatus away from the old tool in the tool direction at least until the old tool is no longer inside the tool holder.

8. The method according to claim 7 comprising the further steps of:

causing the mechatronic installation component to set down the installation apparatus; by the mechatronic installation component;

causing the mechatronic installation component to receive a gripping tool;

receiving a new tool from a magazine via the gripping tool;

causing the mechatronic installation component to move the gripping tool with the new tool until the new tool assumes a holding position in which the gripper can fix the new tool;

fixing the new tool via the gripper;

causing the mechatronic installation component to set down the gripping tool;

causing the mechatronic installation component to receive the installation apparatus;

using the mechatronic installation component to move the installation apparatus into a preparation position; and moving the installation apparatus in the tool direction until the new tool is inserted in the tool holder.

9. The method according to claim 8, the method further comprising:

moving the installation apparatus with the new tool in the tool direction while rotating the tool holder about an axis extending in the tool direction.

10. The method according to claim 7 comprising the further steps of:

causing the mechatronic installation component to set down the installation apparatus;

causing the mechatronic installation component to receive a gripping tool;

causing the mechatronic installation component to receive, via the gripping tool, the old tool that is fixed in the gripper;

causing the gripper to release the old tool; and using the gripping tool to set down the old tool in a magazine.

* * * * *